United States Patent [19]

de Claire

[11] 4,050,494
[45] Sept. 27, 1977

[54] ANTI-ROTATION LOCK FOR FASTENER BOLT

[75] Inventor: Robert B. de Claire, Grosse Pointe Woods, Mich.

[73] Assignee: The United States of America as represented by the Secretary of the Army, Washington, D.C.

[21] Appl. No.: 697,588

[22] Filed: June 18, 1976

[51] Int. Cl.² .......................................... F16B 39/10
[52] U.S. Cl. ................................. 151/49; 151/39
[58] Field of Search .................. 151/39, 40, 41, 50, 151/49, 9-13, 44, 41.5, 37, 34, 33, 52, 53, 68; 180/70 R; 296/29

[56] References Cited

U.S. PATENT DOCUMENTS

| 253,638 | 2/1882 | Smith | 151/52 |
|---|---|---|---|
| 333,155 | 12/1885 | Proctor | 151/39 |
| 543,695 | 7/1895 | Leroux | 151/39 |
| 586,024 | 7/1897 | Gabriel | 151/49 |
| 674,302 | 5/1901 | Moore | 151/39 |
| 887,382 | 5/1908 | Diplock | 151/39 X |
| 1,708,305 | 4/1929 | Flowers | 151/39 |
| 3,395,743 | 8/1968 | Black | 151/52 X |

Primary Examiner—Ramon S. Britts
Attorney, Agent, or Firm—Peter A. Taucher; John E. McRae; Nathan Edelberg

[57] ABSTRACT

An improved lock washer locatable between the head of a fastener bolt and the work being fastened. The lock washer includes a retractable blade having a "hinged" connection with the main plate area of the washer. During thread-in operations the blade assumes a non-obstruct position. When the bolt is torqued to its seated position the blade is engaged with a shoulder formed on the head of the bolt, thereby positively obstructing the bolt from unthreading movement. If it should be necessary to unthread the bolt the blade can be manually pried or forced to a non-obstructing position. The blade has a positive lock action that does not depend on frictional forces.

1 Claim, 11 Drawing Figures

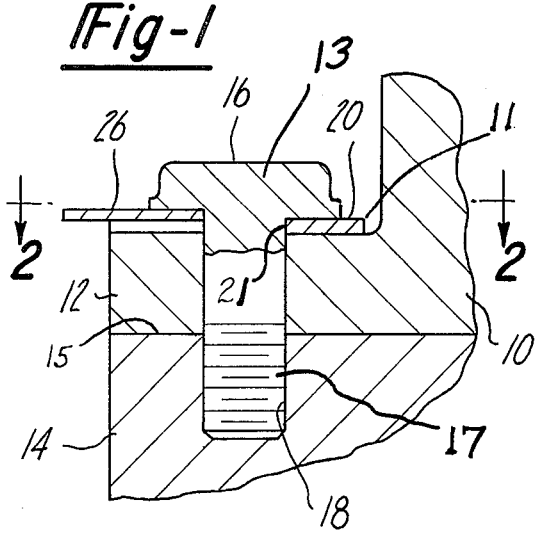
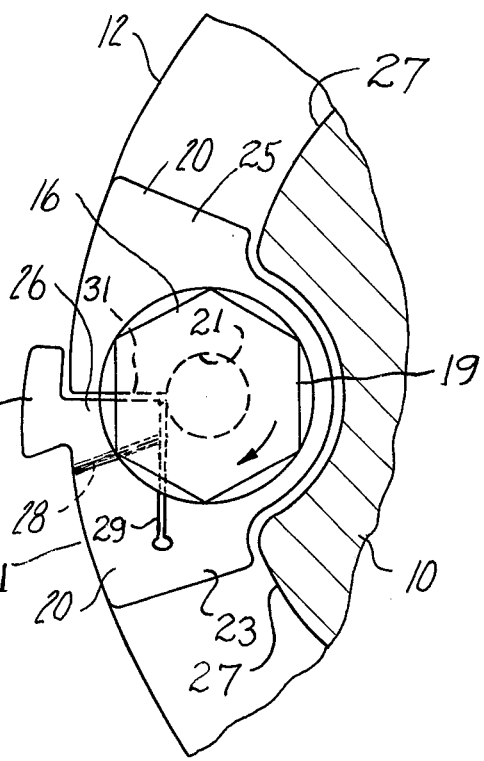
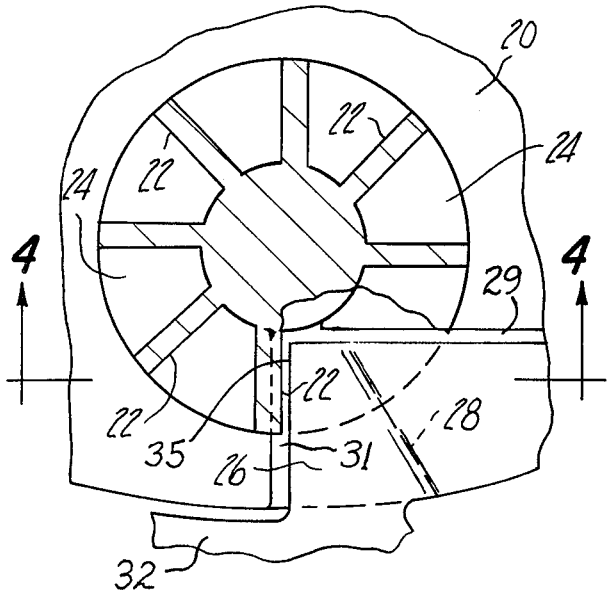
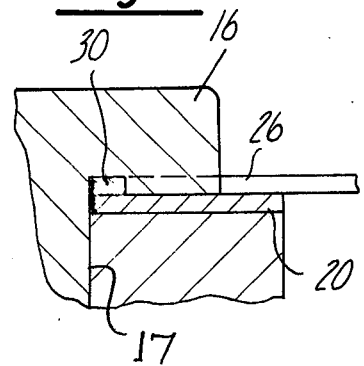
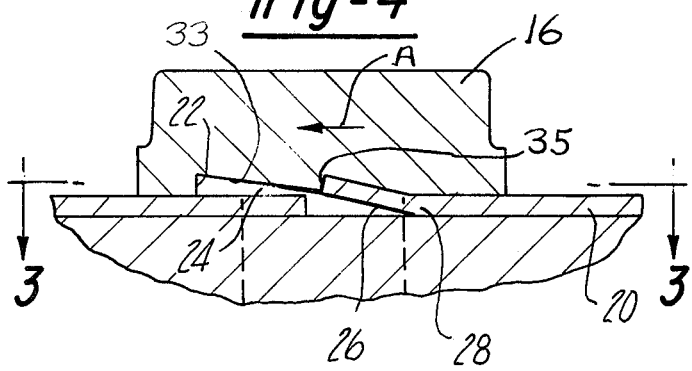

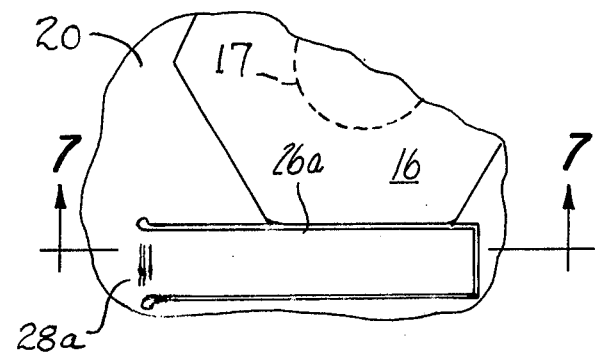
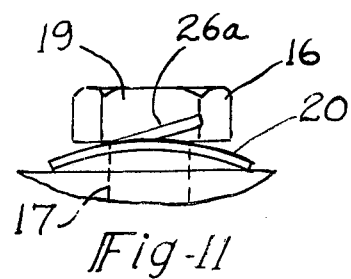
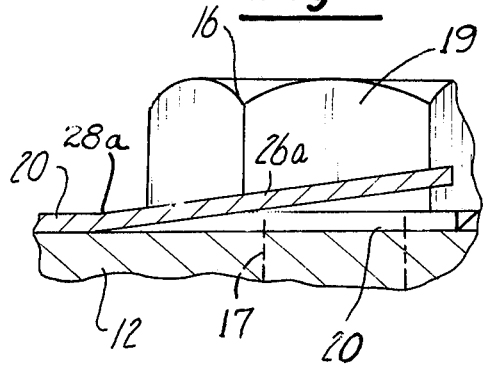
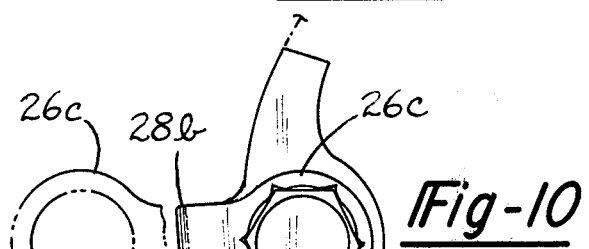
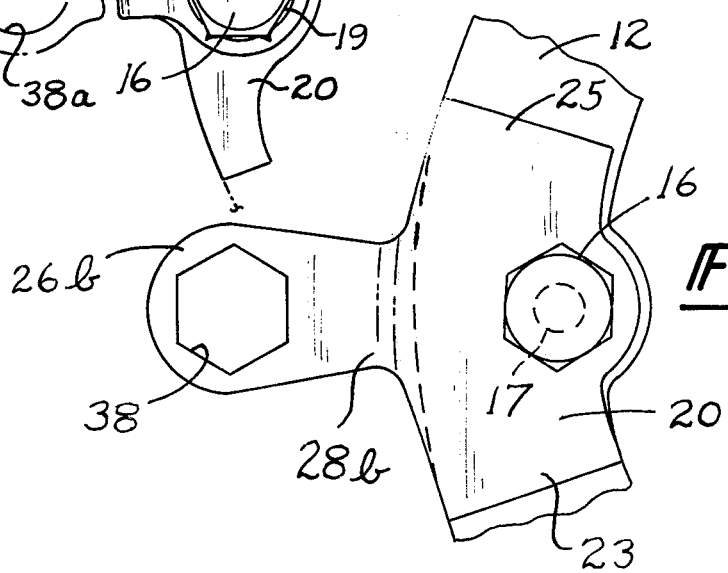
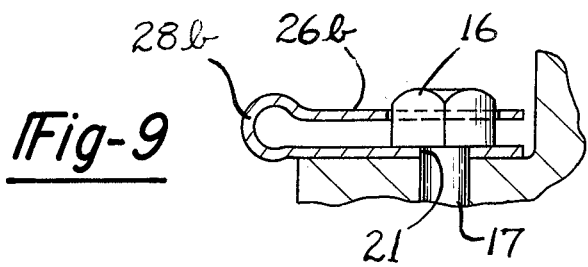

ANTI-ROTATION LOCK FOR FASTENER BOLT

The invention described herein may be manufactured, used, and licensed by or for the Government for governmental purposes without payment to me of any royalty thereon.

BACKGROUND AND SUMMARY OF THE INVENTION

This invention was developed to overcome a failure situation occuring between the engine and transmission in a military vehicle. In this particular vehicle the engine is connected to the bell shaped transmission housing by means of approximately 12 bolts extending through a peripheral flange on the transmission housing into blind tapped holes in the engine mating face. The engine block is formed of aluminum, and the transmission housing is formed of magnesium. In some cases the transmission housing broke off in the area of the flange. Inspection revealed that several of the bolts had become unthreaded from the tapped holes in the engine. It is suspected that when the bolts became unloosened during service the engine and transmission impacted back and forth, thereby exerting high mechanical shock loads on one another, leading to breakage of the transmission housing.

In an attempt to minimize or eliminate the bolt unloosening problem several expedients were tried, including the use of commercially available lock washers, spring friction grip washers, and plastic inserts in the shank portions of the bolts (as used for example in special bolts trademark "lock-tite"). In spite of the various attempted fixes the problem has persisted.

The present invention is directed to a washer-bolt assembly wherein the washer includes a special blade that can be moved from a non-obstructing position out of registry with the bolt head to a bolt-obstruct position engaged with a shoulder on the bolt. When the blade is thus engaged with the bolt head the bolt is positively prevented from rotating in the unthreading direction.

THE DRAWINGS

FIG. 1 fragmentarily illustrates one embodiment of the invention used to mount a transmission on an engine.

FIG. 2 is a sectional view on line 2—2 in FIG. 1.

FIG. 3 is a sectional view on line 3—3 in FIG. 4.

FIG. 4 is a sectional view taken on line 4—4 in FIG. 3.

FIG. 5 illustrates a structural detail that could be employed in the device of FIG. 1.

FIG. 6 is a fragmentary plan view of another embodiment of the invention.

FIG. 7 is a sectional view taken on line 7—7 in FIG. 6.

FIG. 8 illustrates a further embodiment of the invention.

FIG. 9 is a sectional view taken through the FIG. 8 embodiment, with a blade portion thereof adjusted to a bolt obstruct position.

FIG. 10 illustrates an additional embodiment of the invention.

FIG. 11 illustrates a washer-bowing feature that can be used in the assembly of FIG. 6.

FIGS. 1 through 4 fragmentarily show an engine block 14 having a flat face 15 mating with a similar face on a transmission housing 10. Housing 10 is a hollow bell-like housing having a peripheral flange 12 seatable against end face 15 of the engine. The engine and the transmission are rigidly connected together by means of a multiplicity of bolts, one of which is shown at 13 in FIG. 1. In practice the number of bolts is determined by the size of the engine and transmission; illustratively 12 evenly spaced bolts may be used.

Each bolt includes a threaded shank portion 17 threaded into a tapped hole 18 in the engine block. As best shown in FIG. 2, the bolt head 16 is provided with six wrench flats 19 for bolt-turn purposes. The under surface of the bolt head engages the main plate section 20 of a sheet metal washer 11; the shank portion of the bolt extends through a circular hole 21 which locates the washer relative to the bolt.

As best seen in FIGS. 2 and 3 the washer extends outwardly beyond the bolt head to form two wing areas 23 and 25. Any tendency for the bolt to exert a frictional turning force on the washer will cause wing area 25 or 23 to abut against the external surface 27 of transmission housing 10, thereby preventing further washer movement. The washer is slit through, as at 29 and 31, to form a blade 26. As seen best in FIG. 4, blade 26 is permanently deformed or stressed upwardly along a stress line 28 so that blade 26 projects upwardly out of the plane of the washer.

The undersurface of bolt head 16 is formed with eight ratchet teeth designated by numeral 24. Each ratchet tooth defines an inclined cam surface 33 and a vertical shoulder surface 22. During rotational movement of bolt 13 in the thread-in direction, designated by letter A in FIG. 4, the cam surfaces 33 ratchet across the upper face of blade 26. When a desired torque setting is obtained blade 26 will have its free edge 35 abutting shoulder 22 on the bolt head, thus preventing reverse unthreading motion of the bolt.

Blade 26 is provided with an extension 32 located outwardly beyond the turning orbit of the nut. Downward manual pressure on extension 32 moves blade 26 into the plane of plate section 20, thereby enabling wrench-turning of the bolt in the unthreading direction, as necessary to separate the transmission from the engine.

FIG. 5 illustrates a slight structural modification of the FIG. 1 bolt. As shown, the FIG. 5 bolt includes an annular groove 30 at the juncture between the bolt head underface and the bolt shank portion 17. The relief area 30 minimizes the possibility for undesired interference between blade 26 and the bolt fillet area.

FIGS. 6 and 7 illustrate a variant of the invention wherein the wrench flats 19 on the bolt head 16 constitute shoulders cooperable with a locking blade 26a extending from the main plate section 20 of the washer. Blade 26a and plate section 20 are formed from a single strip of material so that the blade can be moved into the plane of section 20. However the blade has a normal free-state position angling upwardly out of the plane of plate section 20, as shown in FIG. 7. The washer is formed of spring material, and is stressed by a forming die to provide a hinge connection 28a; therefore the blade can be pressed downwardly into the plane of the washer, as by a wrench socket applied to bolt head 16 during the bolt-turning operation.

The arrangement of FIGS. 6 and 7 is similar to the arrangement of FIGS. 1 through 4 in respect to the nature of the work pieces 12 and 14, and the configuration of washer section 20. However, in the FIG. 6, 7 arrangement the underface of the bolt head is flat, i.e. devoid of ratchet teeth; the wrench flats 19 form shoulders that serve the function of shoulders 22 shown in FIG. 4. During the bolt thread-in operation a socket wrench is pressed downwardly against blade 26a and turned around the bolt axis. When the bolt head assumes any one of six rotated positions one of its flats 19 is parallel to the edge of blade 26a; removal of the socket wrench then permits blade 26a to spring upwardly to the bolt-obstruct position shown in FIG. 7. Bolt unthreading from the work also requires that the socket wrench be pressured against blade 26a, at least until the bolt head is beyond the blade.

FIGS. 8 and 9 illustrate an arrangement wherein the washer is formed of soft steel or other similar material that can be readily folded or unfolded at the hinge connection 28b between main plate section 20 and blade 26b. The blade is formed with an aperture 38 configured the same as the bolt head 16.

Thread-in operations are performed while the washer is in the flat non-folded condition of FIG. 8. When the bolt is substantially fully tightened the blade 26b is folded around hinge connection 28b to the condition of FIG. 9 wherein head 16 of the bolt projects through aperture 38. The edges defined by aperture 38 abut the bolt head flats 19 to obstruct the bolt against unthreading, as by vibrational load forces. If the washer is formed of soft steel the blade will maintain its. FIG. 9 position. To unthread the bolt it is first necessary to pry up the blade and force it toward the unfolded flat condition of FIG. 8.

The arrangement of FIGS. 8 and 9 requires that the bolt be rotated to a precise position wherein the flats 19 on head 16 register or align with the edges of aperture 38. Where such alignment is difficult or impractical of attainment the structure of FIG. 10 may be preferred. In the FIG. 10 arrangement the blade aperture 38a is circular rather than hexagonal. After the blade 26c has been folded over onto the upper face of the bolt head the socket wrench, not shown, is hammered down against the upper face of the blade to upset the blade material. The blade-deformation force forces the blade down around the bolt head, thereby obstructing the bolt against turning movement.

Circular aperture 38a preferably has a diameter slightly greater than the diammetrical spacing across the bolt head flats. Therefore, when a deformation force is applied to the blade the six bolt head corners pierce the bolt head material. The circular aperture thereby becomes a hexagonal aperture conforming to the outline of the bolt head.

The embodiments of the invention shown in FIGS. 1 through 10 were specifically designed to overcome a bolt-unthreading problem in an engine-transmission environment. In that environment the external side surface 27 of the transmission bell housing was used as an abutment to prevent turning of the washer in the bolt-unthreading direction. In other environments where a similar abutment surface may not be present it might be necessary to devise some other expedient to prevent washer rotation. FIG. 11 illustrates one possible expedient that involves pre-stressed bowing of the washer material. As the bolt head deforms the washer to its flat deformed condition the main plate section of the washer exerts oppositely acting frictional forces on the bolt head and work surface, thereby tending to prevent rotation of the washer. Blade 26a prevents rotation of the bolt in the previously described fashion.

The various forms of the invention shown in the drawings include bolts that are designed with positively-acting lock shoulders 22 (FIG. 4) or 19 (FIGS. 7, 8 or 9). The horizontal dimension of each shoulder 22 or 19 extends normal to the bolt axis, and the vertical dimension of each shoulder extends parallel to the bolt axis. The cooperating blades 26 (FIG. 4) or 26a (FIG. 7), or 26b (FIG. 8) or 26c (FIG. 10) are designed to have their edges (not faces) engaged with the bolt head shoulders. Also, the blades are arranged so that the blade plane substantially coincides with the bolt-turning plane. For example, in FIG. 4 the plane of blade 26 lies substantially in the turning plane of bolt shoulder 22. Likewise, in FIG. 6 the plane of blade 26a coincides substantially with the turning plane of the bolt shoulder 19. In all cases the blade movement plane is normal to the bolt-turning plane; therefore minor vibratory motions of the blade do not allow any play or movement to develop in the bolt.

The described coincidence of the blade plane and bolt-turning plane advantageously places the major dimension of the blade in direct opposition to bolt-unloosening forces. The bolt force is required to pass through the length or width of the blade rather than through the blade thickness dimension. This condition, coupled with the fact that the blade movement plane is normal to the bolt-turning plane, means that the bolt is not likely to exert a camming action on the blade that would tend to deflect the blade from its locked position.

I wish it to be understood that I do not desire to be limited to the exact details of construction shown and described for obvious modifications will occur to a person skilled in the art.

I claim:

1. In an engine-transmission assembly wherein the transmission includes a bell-like housing having a peripheral flange mating with an end face of the engine, the mating areas of the transmission flange and engine face having a number of aligned holes spaced therealong, a bolt having a threaded shank portion extending through each set of aligned holes for thereby rigidly connecting the engine and transmission together, each bolt having a head spaced outwardly from the exposed face of the transmission flange, and a washer associated with each bolt for preventing unthreading thereof from the transmission-engine assembly; each washer including a main plate section underlying the bolt head, and a blade section extending outwardly from said main plate section beyond the peripheral edge of the transmission flange; the main plate section of the washer including a wing area (23 or 25) extending along the surface of the transmission flange with one edge thereof located in near proximity to the transmission bell surface, to thereby prevent the washer from turning around the bolt axis; the head of each bolt having a non-circular outline defining a system of wrench flats on the bolt head side surfaces defing corners therebetween the blade section of each washer having a circular aperture with a diameter slightly greater than the diametrical spacing of the bolt head flats but less than the diametrical spacing of the corners between the flats; the washer being formed of a material that permits the blade section to be moved in hinge-like fashion around its connection with the main plate section, whereby the circular aperture axially aligns with the bolt head; the dimension of the circular aperture and the material of the washer enabling the blade section to be hammered down and around the bolt head so that the bolt head corners defined by the aforementioned flats pierce the blade material, thereby preventing relative rotation of the bolt and washer.

* * * * *